Figure 1:
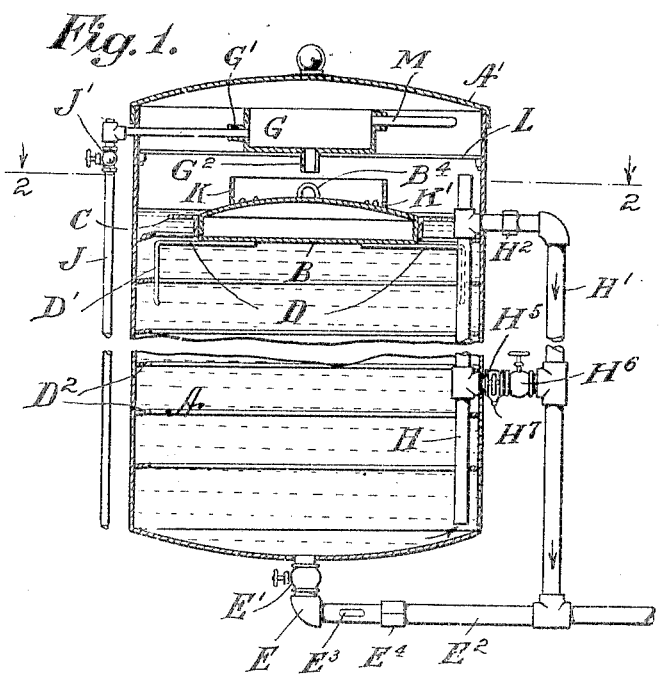

W. H. PARK.
PASTEURIZING PROCESS.
APPLICATION FILED FEB. 1, 1911.

1,009,686.

Patented Nov. 21, 1911.

Attest:
Sara G. O'Rourke
Alan C. McDonnell

Inventor:
Wm. H. Park
by S. J. Cox
Atty

UNITED STATES PATENT OFFICE.

WILLIAM H. PARK, OF NEW YORK, N. Y.

PASTEURIZING PROCESS.

1,009,686.  Specification of Letters Patent.  Patented Nov. 21, 1911.

Application filed February 1, 1911. Serial No. 605,902.

*To all whom it may concern:*

Be it known that I, WILLIAM H. PARK, a citizen of the United States, and a resident of the borough of Manhattan, in the county of New York, city and State of New York, have invented certain new and useful Improvements in Pasteurizing Processes, of which the following is a specification.

The invention relates to a process of pasteurizing milk and other liquids, and its objects are among others, to provide a process whereby the liquid, after being heated to a pasteurizing temperature may be maintained at that temperature for a sufficient period to insure the thorough elimination of bacteria while flowing continuously from the heating apparatus to the cooler or other receptacle, and to insure its operation against accidental or intentional interruption.

It will be understood that it is desirable to have the pasteurizing operation continuous and the flow of the liquid, into the apparatus, through the apparatus for maintaining it for a sufficient time at the proper temperature, through the cooler—if such a device is used—and to the receptacle in which it is to be transported, continuous, so that it is only necessary for the operators to feed the milk at one end of the apparatus and withdraw it from the other in order to secure its thorough pasteurization. All unnecessary delay is thus avoided, and the handling of the liquid intermediate the beginning and the end of the process is obviated. Owing to the fact, however, that the movements of liquid in passing through containers of considerable area cannot be controlled by ordinary mechanical means, and is affected in various ways by friction between it and the walls and other parts of the container, it has not hitherto been possible in an apparatus providing for the continuous flow of the liquid to prevent some of the said liquid from passing therethrough quicker than is desired; and this difficulty gives rise to uncertainty of a thorough pasteurization of all the liquid, rendering the process to a great extent ineffective and undependable.

In view of the fact that milk and other liquids intended for human consumption are often impregnated with germs of disease, the importance of providing a process which will insure that none of the liquid has escaped the pasteurization will be understood.

While the process herein described is of great value in an apparatus consisting of a heater and retaining holder and a cooler, it must not be understood that its use is limited to such an apparatus, since the process may be carried out in any suitable apparatus—whether provided with a heater or a cooler forming a part thereof, or not—and that the liquid may be heated in any desired manner, and caused to flow to any desired receptacle after being subjected to the action of this process.

Figure 2:
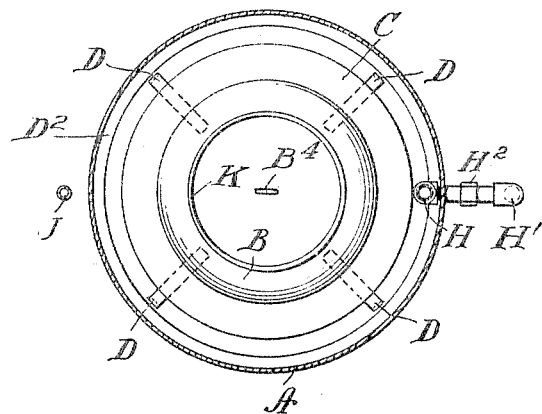

In the accompanying drawings, I have illustrated an apparatus by which the process may be carried out, and in these drawings, Figure 1 is a vertical medial section of such an apparatus, and Fig. 2 is a horizontal cross section of the same on the line 2—2 of Fig. 1, looking in the direction indicated by the arrows.

In order to explain the process I will describe the action of the apparatus, shown in the drawings, in which A represents a cylindrical holder provided with annular horizontal flanges $D^2$ secured to the inner wall of the holder and projecting slightly upward. The purpose of these flanges is to prevent the liquid from gravitating toward the bottom of the holder along its walls. I have found by careful experiment that there is a tendency of the liquid in the holder to gravitate more rapidly along the walls than in the interior of the body of liquid therein. This is due to the fact that the cooling of the liquid begins at the walls and that as soon as the liquid near the walls is cooled it will start to gravitate toward the bottom of the holder for the reason that the lowering of its temperature increases its specific gravity relative to the liquid on the same level in the interior. The flanges $D^2$ will tend to prevent this action and give the cooling liquid at the walls an inward and slightly upward movement.

The supply pipe J is provided with a valve J′ by which the flow of liquid to the holder may be regulated so as to provide for the filling and emptying thereof at a rate that will insure proper pasteurization. By making the depending outlet tube of the receptacle G of the proper size and capacity, however, this result may be accomplished without the use of a valve, and in this case a more rapid flow of liquid than is desired cannot be caused.

The outlet is through the pipe H leading from the bottom of the holder to a point near the top thereof, and provided with a branch pipe H′ extending through the wall of the holder and adapted to be used for the filling of any suitable receptacle. In order that all siphoning action of this pipe may be avoided, its upper end extends above the outlet level and is open. It will be seen that when the liquid rises to the level of the branch pipe H′, it will begin to flow out from the bottom of the holder through this pipe and will continue to flow out as long as the liquid is supplied to the holder. When the supply ceases, the liquid remaining in the holder may be siphoned out by stopping the upper end of the pipe H, or discharged through the outlet E in the extreme bottom of the holder, which is ordinarily closed by the valve E′. This outlet is also useful in the operation of cleaning the holder and, where the contents are siphoned out, for draining the bottom thereof. The pipe H′ joins the pipe $E^2$ at its lower end, and this pipe may be provided with a sight glass $E^3$ in order that the operator or inspector, under whose supervision the pasteurization is carried on, may be sure that no liquid is being discharged through this pipe during the normal operation of the apparatus. The pipe $E^2$ is provided with a joint secured by a collar $E^4$ and the pipe H′ with a similar collar-secured joint $H^2$, in order that they may be removed for thorough cleansing and for transportation purposes.

The receptacle G is positioned and supported upon a cross-piece L secured to the walls of the holder and extending diametrically across the same. This receptacle is provided with an overflow pipe M, and this pipe may be used for the purpose of preventing an overflow from the said receptacle in case the operator fails to observe the influx of liquid and regulate it so that the pipe J will not supply liquid faster than it can escape through the neck $G^2$. This pipe M extends through the wall of the holder and may be arranged to discharge the liquid overflowing through it into any suitable receptacle or to convey it back to the holder or the source of supply.

At times, instead of subjecting the liquid to a moderate heat for a comparatively long period, it is desirable to subject it to a higher temperature for a shorter period. Thus, for instance, it is common practice to subject liquid to a temperature of 150 degrees for thirty minutes or to a temperature of 160 degrees or more for fifteen minutes, and the period will vary in an inverse ratio of the temperature within prescribed limits.

In the case last mentioned it is, of course, desirable to have the holder so arranged that the liquid entering it will be discharged therefrom after a shorter period, and I have therefore provided the branch pipe $H^5$ made in two sections about half-way between the bottom of the holder and the upper outlet. This branch pipe extends through the wall of the holder and communicates with the outside discharge pipe H′. It is also controlled by a valve $H^6$, so that it can be closed when the upper outlet is used, and the outer portion of the pipe is made detachable by means of a joint secured by the collar $H^7$. Through the use of this valve-controlled branch pipe the liquid may be discharged below the normal outlet when desired.

It will be apparent that the apparatus above described is not essential to the carrying out of the process herein described and claimed, and that other apparatus may be employed, or some of the apparatus dispensed with, and its function manually performed. I prefer, however, to use the apparatus described and shown for the purpose of effectuating the process.

It is for the purpose of insuring the proper performance of the requirements hereinbefore stated automatically and without the possibility of accidental or intentional interference therewith that the process which forms the subject matter of this application is principally designed.

In the apparatus illustrated in the drawings, the liquid, after being heated to the desired temperature, is caused to pass into the cylindrical holder A through the pipe J which enters through the wall of the said holder below said cover A′ and has its discharge end connected with the pan G by means of a collar G′ in the side of said pan which receives it. The principal object of having the liquid received by the pan G on entering the holder is to prevent an oversupply and to avoid undue pressure on the spreader by the entering stream. The pan may be observed by removing the cover, or the cover may be made of transparent material, or entirely omitted in order that the depth of the liquid therein may be ascertained. From the pan G the liquid passes, through the depending outlet tube $G^2$ down to the float B, which in the usual operative condition of the apparatus is immediately below the said tube, since the level of liquid in the holder must be such as to raise it to this point before there can be any discharge.

When the holder is first filled the float rises from the bottom as the level of liquid rises, and in this operation the annular flange K concentrically arranged with respect to the float on the upper surface of said float receives the liquid discharged from the tube G′ and checks its tendency to splash against the sides of the holder by causing a pool to be formed. Small openings K' are located at intervals along the lower edge of the flange K for the purpose of permitting all of the liquid therein to flow out.

The float is provided with a plurality of spacers D extending radially therefrom and preferably located 90 degrees apart, so as to space the said float from the walls of the holder and maintain its position in the center thereof. The extremities of the spacing arms D are drawn downwardly to form depending portions D', and the lower ends of these depending portions are inwardly curved. The object of this provision is to prevent the spacers from catching over or under the annular flanges D². A sharp corner is also avoided in bending the parts D' downward so that the angle will readily pass over the inner edges of the flanges. An annular horizontal flange or rim C is also provided at the outer edge of the upper surface of the float, and extends approximately half the distance from the said outer edge to the walls of the holder. The object and purpose of this flange is to give the liquid flowing from the medial part of the convex upper surface of the float a horizontal direction and provide a surface in addition to the upper surface of the float upon which it may spread and by which it will be caused to enter the body of liquid in a thin, slowly flowing body. It will be observed that this flange C is so formed and placed as to be normally slightly submerged, and the object of this provision is to still further check the outward flow of the liquid before it reaches the liquid body in the holder. By these means the liquid is received and caused to spread out gently upon the upper surface of the liquid body in the holder, without receiving any material vertical movement either through its initial movement on entering the holder or through contact with the walls or other parts thereof. The result is that the liquid entering the holder remains on the top of the liquid body and as it cools, and its specific gravity is thereby increased, settles toward the bottom, fresh and warmer liquid flowing in above it constantly. It is, therefore, only necessary to gage the flow of liquid into the holder so that it will fill and empty once in each half hour—or other predetermined time—in order to insure that each particle entering the holder shall remain therein substantially throughout the full period and be discharged therefrom only after it has been subjected to the desired temperature for the proper period of time. The float is provided with a loop B⁴ by which it may be raised from the bottom of the holder and removed, if desired.

It will be observed that in the operation of this process variation in the specific gravity of the liquid due to slight difference in temperature is utilized to secure the gradual passage of each drop through the holder, and that in the apparatus shown this action is inaugurated by the deposition of the freshly heated liquid in such a manner that because of the inferior gravity it will spread out over the top of the liquid body. Auxiliary means, such as baffle plates and flanges, may be employed in carrying out the process to further protect the flow of liquid by its thermal gravity from being disturbed or interrupted.

What I claim is:

1. The herein-described process of sterilizing liquids which consists in first heating and then spreading the liquid upon the upper surface of a body of liquid having a mean lower temperature in such a manner as to prevent vertical movement thereof, and withdrawing the liquid from the lower part of said body at a rate not exceeding the rate of inflow, whereby each atom of the liquid is caused to gravitate gradually from the top to the point of withdrawal through the body by reason of its relative thermal specific gravity and is retained therein a period of time substantially equal to the time required for the entire body to be withdrawn.

2. The herein described process of sterilizing liquids which consists in first heating the liquid and then causing it to flow through a holder by gravity and to be detained therein for a given period determined by the period required for the discharge of substantially all the liquid in said holder, the relative time of discharge of said liquid with respect to that preceding and following it being determined by its relative specific gravity due to temperature.

3. The process of sterilizing liquids herein described which consists in maintaining a body of the liquid of predetermined volume in a container, said volume being determined by the period of time required for it to pass out of said container, and flowing heated liquid upon the upper surface of the said body in such a manner that it is spread out horizontally thereon, and withdrawing the liquid from the lower part of said container at the same rate as the rate of influx.

Witness my hand this 20th day of January, 1911, at the city of New York, in the county and State of New York.

WILLIAM H. PARK.

Witnesses:
 E. W. SCHERR, Jr.,
 ALAN C. McDONNELL.